May 10, 1927.  
V. L. SMITHERS  
DUST CAP FOR TIRE VALVES  
Filed April 26, 1926

1,628,440

Inventor

By Kurz Hudson & Kent
Attorneys

Patented May 10, 1927.

1,628,440

UNITED STATES PATENT OFFICE.

VERNON L. SMITHERS, OF AKRON, OHIO.

DUST CAP FOR TIRE VALVES.

Application filed April 26, 1926. Serial No. 104,523.

This invention relates to dust caps for tire valves and analogous uses and, has for one of its objects the provision of a comparatively inexpensive form of construction that is adapted for manufacture preferably from rubber and may be quickly and conveniently applied to and removed from the tire valve stem.

A further object of the invention is to provide a dust cap that will embody a simple device whereby the cap is caused to automatically indicate the leakage of the tire valve.

Other objects of the invention and the features of novelty will be apparent from the following description taken in connection with the accompanying drawings, of which:

Figure 1:
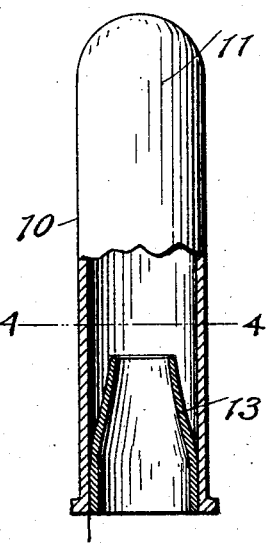
Fig. 1 is a longitudinal section through a dust cap embodying my invention.
Figure 2:
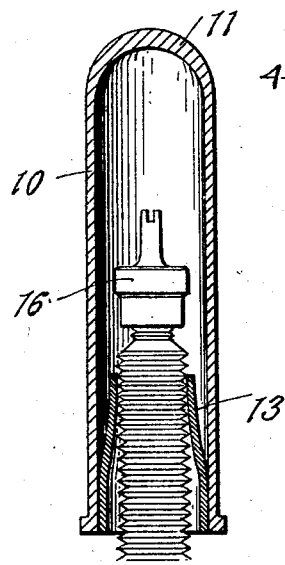
Fig. 2 is a similar view showing the dust cap in its normal position on the stem of the tire valve.

Referring to the drawings, 10 indicates a tubular outer shell, one end of which is closed, as indicated at 11, and the other open to permit the insertion of the tire valve stem. The shell 10 is preferably made of hard rubber, but may be made of metal, soft rubber or other composition material if desired, and the open end of the shell is preferably provided with a reinforcing flange 12. A sleeve 13, of relatively soft pliable rubber, is arranged within the shell 10 and has its outer end vulcanized or otherwise suitably attached to the interior of the shell, adjacent the open end of the latter, as indicated at 14, so as to make an air-tight joint therewith. The main portion of the sleeve 13 is tapered in form and preferably provided with the open inner end 15. The tapering of the sleeve 13 insures that it will tightly grip the outer surface of the valve stem, when the dust cap is forced over the stem, as shown in Fig. 2. The sleeve 13 thus normally grips the valve stem in such a manner as to form an air-tight joint because the soft and resilient nature of the rubber, of which the sleeve is made, permits it to closely conform to the outer surface of the valve stem. At the same time, the sleeve 13 serves to secure the shell 10 to the valve stem in a substantial manner that will prevent the cap from being jarred off from the stem, when in service.

Figure 3:
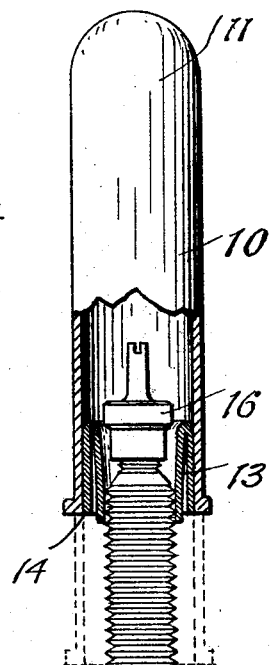
Fig. 3 is a view similar to Fig. 2 but, showing the cap displaced from its normal position to indicate that the valve is leaking.
Figure 4:
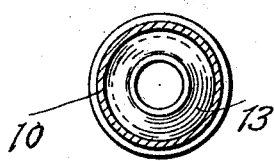
Fig. 4 is a transverse section on the line 4—4 of Fig. 1.

In case the tire valve leaks air, there will be an accumulation of pressure within the shell 10 which will first have the tendency to press the sleeve 13 more closely to the valve stem and, when a sufficient pressure accumulates within the shell, the latter will be lifted and the sleeve 13 turned inside out so as to project from the open end of the sleeve, as shown in Fig. 3. The pressure, within the shell, will then cause the air to be forced out between the sleeve 13 and the valve stem, since the pressure will then be acting on what is then the interior surface of the sleeve and, therefore, tend to expand the latter.

The displacement of the shell 10, from the normal position shown in Fig. 2 to the position shown in Fig. 3, will serve as an indication that the valve is leaking so that my improved dust cap constitutes a simple device which serves to automatically function as a signal to indicate a leaking tire valve.

The usual sealing cap that is employed on the end of the valve stem is indicated at 16 and my improved dust cap functions in substantially the same manner, in all respects, whether there is a cap 16 on the valve stem, or not.

While I have illustrated and described what I now consider to be the preferred form of my invention, it is to be understood that the details of construction that are embodied in such preferred form, are merely illustrative of the principles of the invention and that these details are subject to modification without departing from the spirit of the invention, as defined in the appended claims.

Having thus described my invention, I claim:

1. A dust cap for tire valves comprising a shell which is closed except for an opening into which the valve stem is received, a flexible sleeve having one end thereof sealed to the inner surface of the shell adjacent said opening and normally projecting toward the closed end of the shell, said sleeve being adapted to grip the outer surface of the valve stem and form an airtight connection therewith and being also adapted to be turned inside-out and extend outwardly from the open end of said shell, and when in the latter position to permit air to escape from the interior of the shell along the outer surface of the valve stem.

2. A dust cap for tire valves comprising a rigid outer shell and a flexible inner sleeve having a portion thereof spaced from the interior surface of said shell and adapted to normally grip the valve stem so as to form an air-tight connection therewith, said sleeve being of sufficient length to permit said shell to be moved off the valve stem by air pressure within the shell, for a limited distance to turn the sleeve inside out and then automatically release air from the interior of the shell.

3. A dust cap for tire valves comprising an outer shell having a flexible and reversible sleeve therein for normally forming an air-tight connection with the valve stem the flexibility and reversibility of said sleeve permitting the cap to be moved by pressure within the shell to a position in which air leaking through the valve is automatically released from the shell.

4. A dust cap for tire valves comprising an outer shell of rubber and an inner sleeve of soft rubber vulcanized to the shell.

5. A dust cap for tire valves comprising an outer shell of rubber and an inner sleeve of soft rubber vulcanized at one end to the shell and free from the shell for a portion of its length.

6. A dust cap for tire valves comprising an outer shell of rubber open at one end and an inner sleeve of soft rubber vulcanized to the interior of the shell adjacent said open end and having a contracted portion that projects toward the closed end of the shell and is free from the shell.

In testimony whereof, I hereunto affix my signature.

VERNON L. SMITHERS.